(12) United States Patent
Zhao et al.

(10) Patent No.: US 9,408,195 B2
(45) Date of Patent: Aug. 2, 2016

(54) METHOD, SYSTEM AND DEVICE FOR CELL MANAGEMENT

(71) Applicant: China Academy of Telecommunications Technology, Beijing (CN)

(72) Inventors: Yali Zhao, Beijing (CN); Jing Liang, Beijing (CN); Zhe Fu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 21 days.

(21) Appl. No.: 14/420,283

(22) PCT Filed: Jul. 31, 2013

(86) PCT No.: PCT/CN2013/080560
§ 371 (c)(1),
(2) Date: Feb. 6, 2015

(87) PCT Pub. No.: WO2014/023177
PCT Pub. Date: Feb. 13, 2014

(65) Prior Publication Data
US 2015/0223220 A1    Aug. 6, 2015

(30) Foreign Application Priority Data
Aug. 8, 2012 (CN) .......................... 2012 1 0280081

(51) Int. Cl.
*H04W 72/00*    (2009.01)
*H04W 72/04*    (2009.01)
(Continued)

(52) U.S. Cl.
CPC ......... *H04W 72/0406* (2013.01); *H04L 1/1812* (2013.01); *H04L 41/0813* (2013.01);
(Continued)

(58) Field of Classification Search
USPC .......................................... 455/436–448, 450
See application file for complete search history.

(56) References Cited

FOREIGN PATENT DOCUMENTS

| CN | 101772098 | 7/2010 |
|---|---|---|
| CN | 102131200 | 7/2011 |

(Continued)

OTHER PUBLICATIONS

Extended European Search Report for EP Application No. 13827985.6 dated Oct. 23, 2015.

(Continued)

*Primary Examiner* — Joel Ajayi
(74) *Attorney, Agent, or Firm* — Foley & Lardner LLP; James F. Ewing; Paul M. H. Pua (57) ABSTRACT

The embodiments of the application relate to the technical field of wireless communications, especially relate to a method, system and device for cell management, which are used to manage the cells under the local node in the hierarchical network deployments scene of segregation of user plane and control plane. The method of the embodiments of the application includes: a macro base station determines the need to manage the cells under a local base station; the macro base station notifies said local base station to manage the cells under the local base station. In the embodiments of the application the macro base station notifies the local base station to manage the cells under the local base station. Since in the embodiments of application the macro base station assists the local base station to manage the cells under the local base station, thus implementing to manage the cells under the local node in the hierarchical network deployment scene of segregation of user plane and control plane, further improving the system performance.

20 Claims, 5 Drawing Sheets

(51) Int. Cl.
*H04W 24/02* (2009.01)
*H04L 1/18* (2006.01)
*H04W 76/04* (2009.01)
*H04W 16/32* (2009.01)
*H04W 92/20* (2009.01)
*H04L 12/24* (2006.01)

(52) U.S. Cl.
CPC ............... *H04L41/18* (2013.01); *H04W 24/02* (2013.01); *H04W 76/046* (2013.01); *H04L 1/1867* (2013.01); *H04L 41/0806* (2013.01); *H04W 16/32* (2013.01); *H04W 92/20* (2013.01)

(56) References Cited

FOREIGN PATENT DOCUMENTS

| | | |
|---|---|---|
| CN | 102348244 | 2/2012 |
| EP | 0898436 | 2/1999 |
| GB | 2486926 | 7/2012 |

OTHER PUBLICATIONS

Zukang Shen et al: "Overview of 3GPP LTE-advanced carrier aggregation for 4G wireless communications", IEEE Communications Magazine, IEEE Service Center, Piscataway, US, vol. 50, No. 2, Feb. 1, 2012, pp. 122-130, XP011417048, ISSN: 0163-6804, DOI: 10.1109/MCOM.2012.6146491 * Sections "Deployment Scenarios" and 11 Cell Managemtn; figure 1 *.

NTT Docomo: "Discussion on 1CC transmission in a TTI for uplink inter-band carrier aggregation", 3GPP Draft; R4-121559, 3rd Generation Partnership Project (3GPP), Mobile Competence Centre; 650, Route Des Lucioles ; F-06921 Sophia-Antipolis Cedex ; France, vol. RAN WG4, No. Jeju; Mar. 26, 2012-Mar. 30, 2012, Mar. 19, 2012, XP050612960, [retrieved on Mar. 19, 2012] * Section 2; figure 1 *.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11) ", 3GPP Standard; 3GPP TS 36.300, 3rd Generation Partnership Project (3GPP), Mobile Competence Centre ; 650, Route Des Lucioles ; F-06921 Sophia-Antipolis Cedex ; France, vol. RAN WG2, No. V11.2.0, Jun. 27, 2012, pp. 1-201, XP050581140, [retrieved on Jun. 27, 2012] *Section 7.5 and Annex J *.

Ericsson: "Scenarios selection for carrier based HetNet ICIC", 3GPP Draft; R3-112053 HetNet EICIC Scenarios, 3rd Generation Partnership Project (3GPP), Mobile Competence Centre ; 650, Route Des Lucioles ; F-06921 Sophia-Antipolis Cedex ; France, vol. RAN WG3, No. Athens, Greece; Aug. 22, 2011, Sep. 9, 2011, XP050541682, [retrieved on Sep. 9, 2011] * Section 2.1.2 *.

Nokia Siemens Networks (Rapporteur): "Report email#02bis: operational carrier selection at pico", 3GPP Draft; R3-120484 CB-ICIC_Carrier-Switching, 3rd Generation Partnership Project (3GPP), Mobile Competence Centre; 650, Route Des Lucioles ; F-06921 Sophia-Antipolis Cedex ; France, vol. RAN WG3, No. San Jose del Cabo, Mexico; Mar. 26, 2010-Mar. 30, 2012 Apr. 2, 2012, XP050668850, Retrieved from the Internet: URL: http://www.3gpp.org/ftp/tsg_ran/WG3_Iu/TSGR3_75bis/Docs/ [retrieved on Apr. 2, 2012] * Section 2.2 *.

Partial Supplementary European Search Report for EP Application No. 13827985.6 dated Jul. 16, 2015.

International Search Report for PCT/CN2013/080560 mailed Oct. 31, 2013.

Fig.1

--Prior Art--

Fig.2

--Prior Art--

Fig.9

METHOD, SYSTEM AND DEVICE FOR CELL MANAGEMENT

This application is a US National Stage of International Application No. PCT/CN2013/080560, filed 31 Jul. 2013, designating the United States, and claiming priority to Chinese Patent Application No. 201210280081.6, filed with the State Intellectual Property Office of the People's Republic of China on Aug. 8, 2012, and entitled "METHOD, SYSTEM AND DEVICE FOR CELL MANAGEMENT", which is hereby incorporated by reference in its entirety.

FIELD OF THE INVENTION

The present invention relates to the technical field of radio communications, and particularly to a method, a system and a device for cell management.

BACKGROUND OF THE INVENTION

The peak rate of a Long Term Evolution-Advanced (LTE-A) system is greatly improved compared with that of a Long Term Evolution (LTE) system, to meet the requirements of downlink 1 Gbps and uplink 500 Mbps. At the same time, the LTE-A system is required to have good compatibility with the LTE system. Based on the demand of improving the peak rate, being compatible with the LTE system and fully utilizing spectrum resources, Carrier Aggregation (CA) technology is introduced into the LTE-A system.

The carrier aggregation technology refers to a mechanism in which User Equipment (UE) may simultaneously aggregate multiple cells and the multiple cells may simultaneously provide data transmission services for the UE. In a carrier aggregation system, carriers corresponding to the cells may be continuous or discontinuous in the frequency domain, to be compatible with the LTE system, the maximum bandwidth of each component carrier is 20 MHz, and the bandwidths between the component carriers may be the same or different.

Under the carrier aggregation, working cells of a terminal are divided into a Primary Cell (PCell) and multiple Secondary Cells (SCells), the primary cell is used for most control and signaling work, for example, sending uplink feedback of downlink data, reporting channel quality indicator (Channel Quality Indicator, CQI), transmitting uplink pilot carrier and the like, and the secondary cells are mainly used as resources for performing a data transmission function.

Component Carrier (CC) management may also be called cell management, and the concept is introduced based on a CA scenario. Under the CA condition, the CC management merely includes management on the secondary cells, for example, adding, modifying and deleting the SCells; but in a broad sense, management on the primary cell, for example, determining the PCell, changing the PCell and the like, may also be included in the scope of the CC management.

The CC management before release (Rel) 11 may consider a variety of factors, for example, a measurement result, load, interference and other factors. In the carrier aggregation system before R11, the CC management of the SCell is achieved by a radio resource control (Radio Resource Control, RRC) reconfiguration process; for the PCell change, it is achieved by a switching process.

Figure 1:
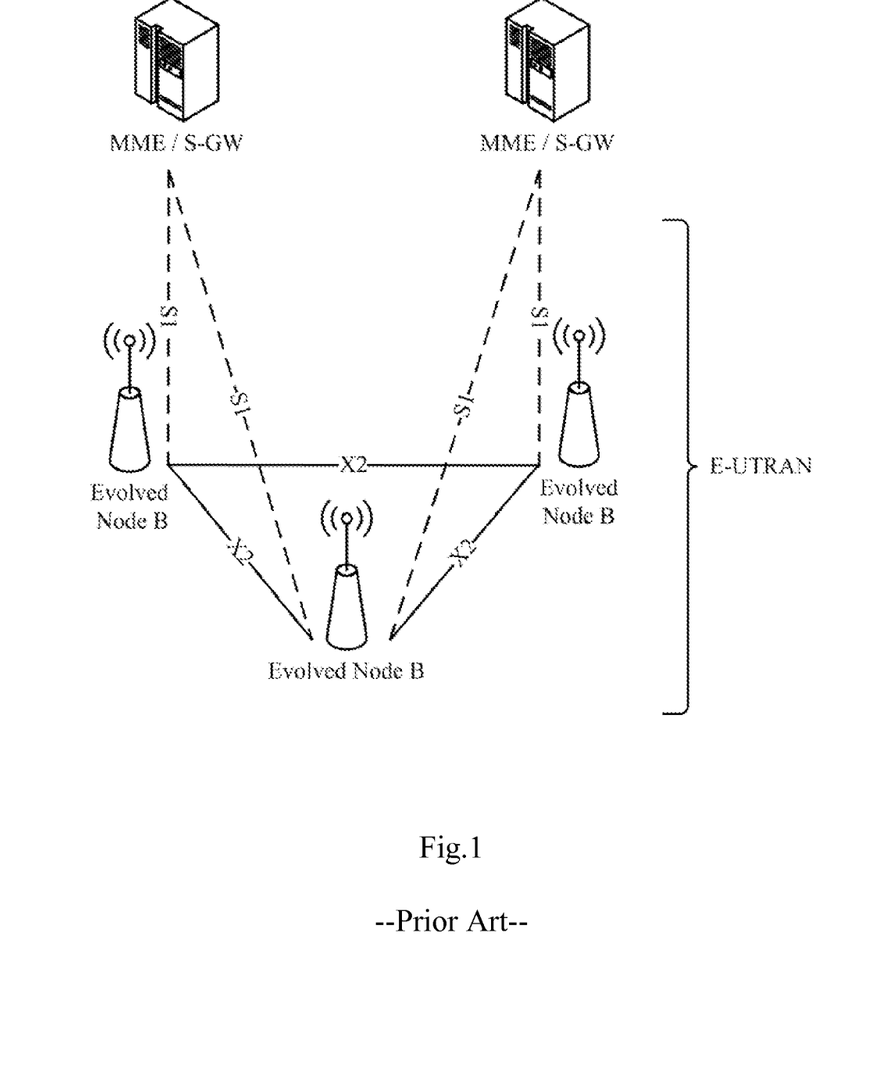
FIG. 1 is a schematic diagram of a network architecture of an E-UTRAN in the prior art.

The LTE network architecture is as shown in FIG. 1, a Mobility Management Entity (MME) is connected with an eNB through an S1-MME interface; the eNB completes an access network function and communicates with the UE through an air interface. There is one MME providing service for each UE attached to the network. The MME is called a serving MME of the UE.

Figure 2:
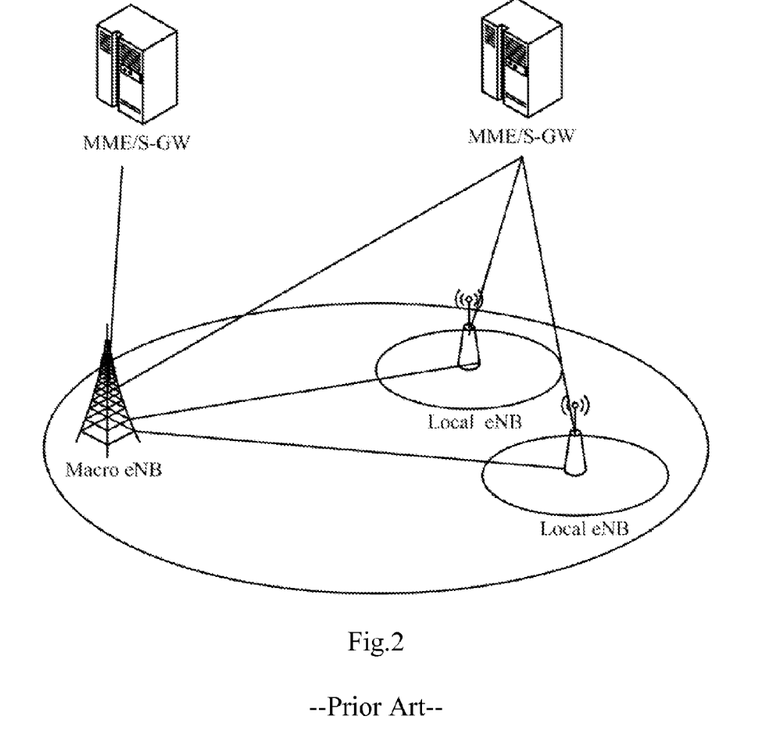
FIG. 2 is a heterogeneous network deployment scenario including a Local eNB and a Macro eNB in the prior art.

A heterogeneous network deployment scenario including a Local eNB and a Macro eNB is as shown in FIG. 2. The Macro eNB provides macro coverage, and the Local eNB provides hotspot coverage within the macro coverage range.

For the network architecture as shown in FIG. 2, if in accordance with the existing mechanism, when moving within the Macro cell coverage range, the UE may continuously perform a switching operation between a Macro cell and a Local cell. In order to avoid data transmission interruption resulting from frequent switching, one manner is to separate bearers of a user plane and a control plane. However, in a bearer separation scenario, there is still no solution for managing cells controlled by a local node.

In summary, in a hierarchical network deployment scenario in which the user plane is separated from the control plane, there is still no solution for managing the cells controlled by the local node at present.

SUMMARY OF THE INVENTION

Embodiments of the present invention provide a method, a system and a device for cell management, which are used for managing cells controlled by a local node in a hierarchical network deployment scenario in which a user plane is separated from a control plane.

An embodiment of the present invention provides a method for cell management, which includes:
determining, by a macro eNB, that cells controlled by a local eNB need to be managed;
notifying, by the macro eNB, the local eNB to manage the cells controlled by the local eNB.

An embodiment of the present invention provides another method for cell management, which includes:
receiving, by a local eNB, a notification of managing cells controlled by the local eNB from a macro eNB;
managing, by the local eNB, the cells controlled by the local eNB according to the received notification.

An embodiment of the present invention provides a method for cell management, which includes:
receiving, by a user equipment, a notification of managing cells controlled by a connected local eNB from a network side;
managing, by the user equipment, the cells controlled by the local eNB according to the received notification.

An embodiment of the present invention provides a macro eNB for cell management, which includes:
a determining component, configured to determine that cells controlled by a local eNB need to be managed;
a first processing component, configured to notify the local eNB to manage the cells controlled by the local eNB.

An embodiment of the present invention provides a local eNB for cell management, which includes:
a first receiving component, configured to receive a notification of managing cells controlled by the local eNB from a macro eNB; a second processing component, configured to manage the cells controlled by the local eNB according to the received notification.

An embodiment of the present invention provides a user equipment for cell management, which includes:
a second receiving component, configured to receive a notification of managing cells controlled by a connected local eNB from a network side;

a third processing component, configured to manage the cells controlled by the local eNB according to the received notification.

An embodiment of the present invention provides a system for cell management, which includes:

a macro eNB, configured to determine that cells controlled by a local eNB need to be managed, and notify the local eNB to manage the cells controlled by the local eNB;

the local eNB, configured to receive a notification of managing cells controlled by the local eNB from the macro eNB, and manage the cells controlled by the local eNB according to the received notification.

In embodiments of the present invention, the macro eNB notifies the local eNB to manage the cells controlled by the local eNB. In embodiments of the present invention, since the macro eNB assists the local eNB to manage the cells controlled by the local eNB, management on the cells controlled by the local node is achieved in the hierarchical network deployment scenario in which the user plane is separated from the control plane; the system performance is further improved.

DETAILED DESCRIPTION OF THE EMBODIMENTS

Bearer separation is to allow UE to simultaneously aggregate resources of a Local eNB and a Macro eNB, but the RRC connection of the UE is maintained under the Macro eNB, thus the Local resources are merely used for transmitting data rather than transmitting control information. If the Local eNB could not transmit the control information, then the control plane protocol stack of the Macro eNB and the Local eNB is as follows, according to the structure of the control plane protocol stack, for the UE with bearer separation, RRC layer control is only under the Macro eNB, and the Local eNB has no RRC control function. As far as a control plane protocol stack under a partial Macro/Local eNB hierarchical networking condition is concerned, since the Local eNB has no RRC function, the node could not receive a measurement result, thus being not able to manage cells controlled by a local node.

In embodiments of the present invention, a macro eNB notifies a local eNB to manage the cells controlled by the local eNB. In embodiments of the present invention, since the macro eNB assists the local eNB to manage the cells controlled by the local eNB, management on the cells controlled by the local node is achieved in a hierarchical network deployment scenario in which a user plane is separated from a control plane.

The macro eNB in embodiments of the present invention may be an LTE macro eNB; the local eNB in embodiments of the present invention may be a Pico eNB or a Home eNB or a Relay device and the like of LTE.

It should be noted that, in embodiments of the present invention, cell management may also be called carrier management, in the case of carrier management, corresponding cells in embodiments of the present invention are changed into carriers, for example, a secondary cell may be changed into a secondary carrier, and a primary cell may be changed into a primary carrier.

Embodiments of the present invention will be described in detail below in combination with drawings.

In the following illustration process, the cooperative implementation of a network side and a user equipment side is firstly illustrated, and finally the implementation of the network side and the implementation of the user equipment side are illustrated respectively, but this does not mean that the two must be cooperatively implemented, actually, when the network side and the user equipment side are separately implemented, problems respectively existing at the network side and the user equipment side are solved as well, but when the two are cooperatively used, a better technical effect will be acquired.

Figure 3:
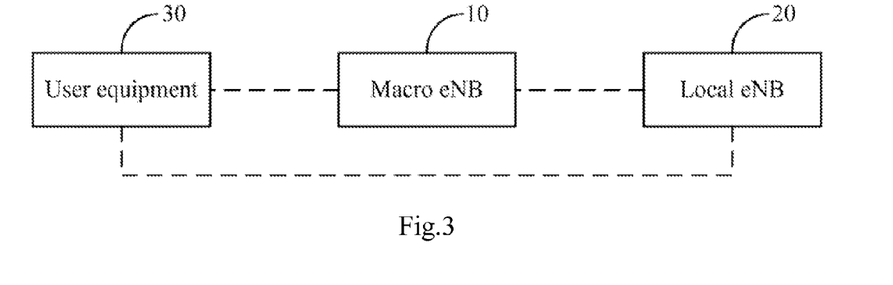
FIG. 3 is a schematic structural diagram of a system for cell management provided by an embodiment of the present invention.

As shown in FIG. 3, a system for cell management in embodiment of the present invention includes a macro eNB 10 and a local eNB 20.

The macro eNB 10 is configured to determine that cells controlled by the local eNB 20 need to be managed, and notify the local eNB 20 to manage the cells controlled by the local eNB 20; and the local eNB 20 is configured to receive a notification of managing the cells controlled by the local eNB from the macro eNB 10, and manage the cells controlled by the local eNB 20 according to the received notification.

The macro eNB 10 notifies the local eNB 20 through an interface between the macro eNB 10 and the local eNB 20.

In implementation, the macro eNB 10 needs to notify the local eNB 20 of the configuration information of the cells needing to be managed.

Correspondingly, the local eNB 20 manages the cells controlled by the local eNB 20 according to the configuration information of the managed cells in the received notification.

Preferably, after managing the cells controlled by the local eNB 20, the local eNB 20 sends response information to the macro eNB 10.

The macro eNB 10 or the local eNB 20 may also notify a user equipment to manage the cells controlled by the local eNB aggregated by the user equipment through dedicated signaling.

The dedicated signaling is RRC signaling, Medium Access Control (MAC) signaling or physical layer signaling.

Correspondingly, the system for cell management in an embodiment of the present invention further includes user equipment 30.

The user equipment 30 is configured to receive a notification of managing the cells controlled by the connected local eNB 20 from a network side, and manage the cells controlled by the local eNB 20 according to the received notification.

In implementation, the macro eNB 10 or the local eNB 20 notifies the user equipment 30 of the configuration information of the cells needing to be managed.

Correspondingly, the user equipment 30 manages the cells controlled by the local eNB 20 aggregated by the user equipment, according to the configuration information of the cells needing to be managed in the received notification.

Preferably, if the dedicated signaling is the RRC signaling, the user equipment 30 sends RRC reconfiguration completion information to the network side, after managing the cells controlled by the local eNB 20; if the dedicated signaling is the MAC signaling, the user equipment 30 performs Hybrid Automatic Repeat reQuest (HARQ) feedback on the MAC signaling notified for cell management; the user equipment 30 may also perform no feedback, and the network side determines a cell management completion moment according to a cell management signaling sending moment and a fixed timing relationship.

Correspondingly, if the macro eNB 10 notifies the user equipment 30 to manage the cells, after receiving the RRC reconfiguration completion message from the user equipment 30, or after receiving the HARQ feedback on the MAC signaling notified for cell management from the user equipment, or after the cell management completion moment is determined according to the cell management signaling sending moment and the fixed timing relationship, the macro eNB 10 notifies the local eNB 20 of cell management completion.

Correspondingly, if the local eNB 20 notifies the user equipment 30 to manage the cells, the macro eNB 10 firstly notifies the local eNB 20 to manage the cells, and then, the local eNB 20 notifies the user equipment 30 to manage the cells. After receiving the RRC reconfiguration completion message from the user equipment 30, or after receiving the HARQ feedback on the MAC signaling notified for cell management from the user equipment, or after the cell management completion moment is determined according to the cell management signaling sending moment and the fixed timing relationship, the local eNB 20 notifies the macro eNB 10 of cell management completion.

In implementation, the cells include a primary cell and a secondary cell, and the different cells are respectively illustrated below.

First scenario, the secondary cell controlled by the local eNB is managed.

The management on the secondary cell controlled by the local eNB includes, but not limited to, at least one of the following operations: adding the secondary cell, deleting the secondary cell or modifying the configuration information of the secondary cell.

If the management on the secondary cell controlled by the local eNB is adding the secondary cell, the configuration information of the managed secondary cell includes all configuration information of the secondary cell;

if the management on the secondary cell controlled by the local eNB is deleting the secondary cell, the configuration information of the managed secondary cell includes an identifier of the secondary cell;

if the management on the secondary cell controlled by the local eNB is modifying the configuration information of the secondary cell, the configuration information of the managed secondary cell includes the configuration information of the secondary cell needing to be modified; under the condition that modifying the configuration information of the secondary cell is performed by firstly deleting a secondary cell and then adding a secondary cell, the configuration information of the managed secondary cell includes the identifier of the deleted secondary cell and all configuration information of the added secondary cell.

For the first scenario, preferably, the local eNB 20 may also send the secondary information of the secondary cell controlled by the local eNB to the macro eNB 10.

The secondary information of the secondary cell includes, but not limited to, at least one of the following information: cell load, the data size in a Packet Data Convergence Protocol (PDCP), the data size in a Radio Link Control (RLC) buffer or a cell interference condition.

Second scenario, the primary cell controlled by the local eNB is managed.

The management on the primary cell controlled by the local eNB includes: selecting the primary cell or changing the primary cell.

The configuration information for selecting the primary cell or changing the primary cell is all or a part of the configuration information of the primary cell.

For the second scenario, preferably, the local eNB 20 may also send the secondary information of the primary cell controlled by the local eNB to the macro eNB 10.

The secondary information of the primary cell includes, but not limited to, at least one of the following information: an identifier (such as a serial number of the primary cell, or other information capable of uniquely identifying the primary cell) of the intended primary cell, the load of the respective cells or the interference conditions of the respective cells.

For the second scenario, configuration information used for managing the secondary cell may also be carried at the same time of sending the configuration information of the primary cell.

Specifically, the macro eNB 10 notifies the local eNB 20 of the configuration information of the secondary cell controlled by the local eNB 20; correspondingly, the local eNB 20 manages the secondary cell controlled by the local eNB according to the configuration information of the secondary cell controlled by the local eNB in the received notification. The management herein includes a part or all of the following operations: adding the secondary cell, deleting the secondary cell or modifying the configuration information of the secondary cell.

The macro eNB 10 or the local eNB 20 notifies the user equipment of the configuration information of the secondary cell controlled by the local eNB 20; correspondingly, the user equipment 30 manages the secondary cell controlled by the local eNB 20 aggregated by the user equipment 30 according to the configuration information of the secondary cell controlled by the local eNB 20 in the received notification. The management herein includes a part or all of the following operations: adding the secondary cell, deleting the secondary cell or modifying the configuration information of the secondary cell.

If the management on the primary cell controlled by the local eNB is changing the primary cell, the changed primary cell is in an activated state by default; or the changed primary cell is in an inactivated state by default, and when the primary cell needs to be used, the macro eNB 10 sends activation signaling to the local eNB 20 to activate the primary cell controlled by the local eNB 20.

If the management on the primary cell controlled by the local eNB is changing the primary cell; no data transmission is performed between the local eNB 20 and the user equipment 30 from receiving primary cell change indication to completing primary cell change.

Figure 4A:
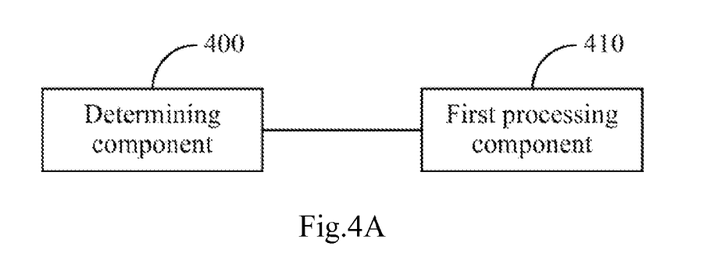
FIG. 4A is a schematic diagram of a functional structure of a macro eNB in a system for cell management provided by an embodiment of the present invention.

As shown in FIG. 4A, the macro eNB of the system for cell management in the embodiment of the present invention includes a determining component 400 and a first processing component 410.

The determining component 400 is configured to determine that cells controlled by a local eNB need to be managed; the first processing component 410 is configured to notify the local eNB to manage the cells controlled by the local eNB.

Preferably, after the determining component determines that the cells controlled by the local eNB need to be managed, the first processing component 410 notifies user equipment to manage the cells controlled by the local eNB aggregated by the user equipment through dedicated signaling, where the dedicated signaling is RRC signaling, MAC signaling or physical layer signaling.

Preferably, if the dedicated signaling is the RRC signaling, the first processing component 410 notifies the local eNB of cell management completion, after receiving an RRC reconfiguration completion message from the user equipment; or the first processing component 410 notifies the local eNB of cell management completion, after receiving HARQ feedback on the MAC signaling notified for cell management from the user equipment; or the first processing component 410 notifies the local eNB of cell management completion, after a cell management completion moment is determined according to a cell management signaling sending moment and a fixed timing relationship.

Preferably, the first processing component 410 notifies the local eNB of the configuration information of the cells needing to be managed;

preferably, the first processing component 410 notifies the user equipment of the configuration information of the cells needing to be managed.

Preferably, the first processing component 410 receives the secondary information from the cells controlled by the local eNB.

Figure 4B:
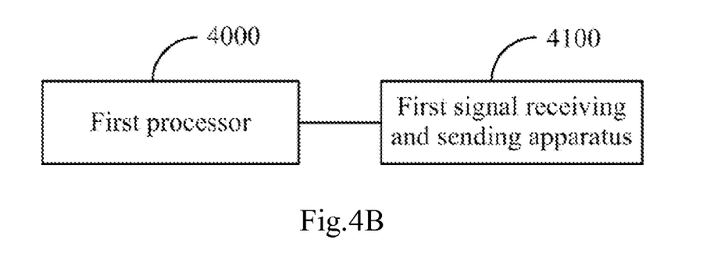
FIG. 4B is a schematic diagram of an entity structure of a macro eNB in a system for cell management provided by an embodiment of the present invention.

Specifically, in hardware, the determining component 400 may be a processor, the first processing component 410 may be a signal receiving and sending apparatus including a receiving and sending antenna and the like, at this time, as shown in FIG. 4B, the macro eNB of the system for cell management in an embodiment of the present invention includes:

a first processor 4000, configured to determine that cells controlled by a local eNB need to be managed;

a first signal receiving and sending apparatus 4100, configured to notify the local eNB to manage the cells controlled by the local eNB.

Preferably, after the first processor 4000 determines that the cells controlled by the local eNB need to be managed, the first signal receiving and sending apparatus 4100 notifies the user equipment to manage the cells controlled by the local eNB aggregated by the user equipment through dedicated signaling, where the dedicated signaling is RRC signaling, MAC signaling or physical layer signaling.

Preferably, if the dedicated signaling is the RRC signaling, the first signal receiving and sending apparatus 4100 notifies the local eNB of cell management completion after receiving an RRC reconfiguration completion message from the user equipment; or the first signal receiving and sending apparatus 4100 notifies the local eNB of cell management completion, after receiving HARQ feedback on the MAC signaling notified for cell management from the user equipment; or the first signal receiving and sending apparatus 4100 notifies the local eNB of cell management completion, after a cell management completion moment is determined according to a cell management signaling sending moment and a fixed timing relationship.

Preferably, the first signal receiving and sending apparatus 4100 notifies the local eNB of the configuration information of the cells needing to be managed;

preferably, the first signal receiving and sending apparatus 4100 notifies the user equipment of the configuration information of the cells needing to be managed.

Preferably, the first signal receiving and sending apparatus 4100 receives the secondary information from the cells controlled by the local eNB.

Figure 5A:
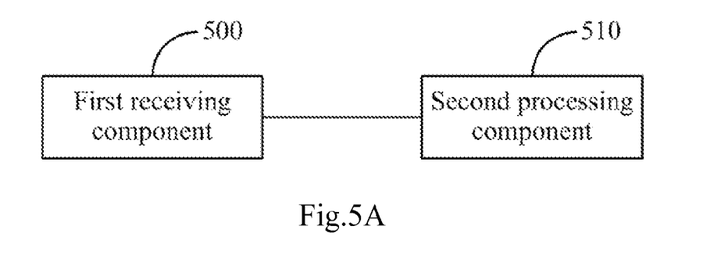
FIG. 5A is a schematic diagram of a functional structure of a local eNB in a system for cell management provided by an embodiment of the present invention.

As shown in FIG. 5A, the local eNB of the system for cell management in the embodiment of the present invention includes: a first receiving component 500 and a second processing component 510.

The first receiving component 500 is configured to receive a notification of managing cells controlled by the local eNB from the macro eNB;

the second processing component 510 is configured to manage the cells controlled by the local eNB according to the received notification.

Preferably, the second processing component 510 manages the cells controlled by the local eNB according to the configuration information of the managed cells in the received notification.

Preferably, after the first receiving component receives the notification of managing the cells controlled by the local eNB from the macro eNB, the second processing component 510 notifies user equipment to manage the cells controlled by the local eNB aggregated by the user equipment through dedicated signaling, where the dedicated signaling is RRC signaling, MAC signaling or physical layer signaling.

Preferably, after notifying the user equipment to manage the cells controlled by the local eNB aggregated by the user equipment through the dedicated signaling, and after receiving an RRC reconfiguration completion message from the user equipment, the second processing component 510 notifies the macro eNB of cell management completion; or after receiving HARQ feedback on the MAC signaling notified for cell management from the user equipment, the second processing component 510 notifies the macro eNB of cell management completion; or after a cell management completion moment is determined according to a cell management signaling sending moment and a fixed timing relationship, the second processing component 510 notifies the macro eNB of cell management completion.

Preferably, after managing the cells controlled by the local eNB, the second processing component 510 sends response information to the macro eNB.

Preferably, the second processing component 510 sends the secondary information of the cells controlled by the local eNB to the macro eNB.

Figure 5B:
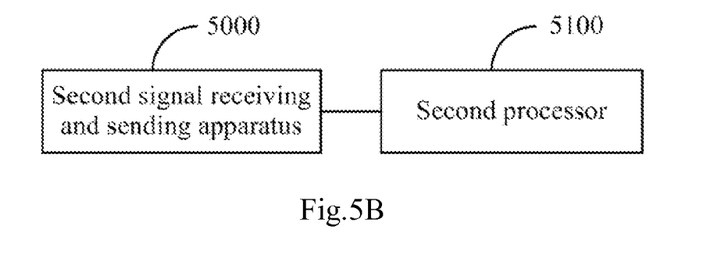
FIG. 5B is a schematic diagram of an entity structure of a local eNB in a system for cell management provided by an embodiment of the present invention.

Specifically, in hardware, the first receiving component 500 may be a signal receiving and sending apparatus including a receiving and sending antenna and the like, the second processing component 510 may be a signal receiving and sending apparatus including a processor and a receiving and sending antenna and the like, at this time, as shown in FIG.

5B, the local eNB of the system for cell management in an embodiment of the present invention includes:

a second signal receiving and sending apparatus 5000, configured to receive a notification of managing cells controlled by the local eNB from the macro eNB;

a second processor 5100, configured to manage the cells controlled by the local eNB according to the received notification.

Preferably, the second processor 5100 manages the cells controlled by the local eNB according to the configuration information of the managed cells in the received notification.

Preferably, the second signal receiving and sending apparatus 5000 is further configured to notify a user equipment to manage the cells controlled by the local eNB aggregated by the user equipment through dedicated signaling, after receiving the notification of managing the cells controlled by the local eNB from the macro eNB, where the dedicated signaling is RRC signaling, MAC signaling or physical layer signaling.

Preferably, the second signal receiving and sending apparatus 5000 is further configured to notify the macro eNB of cell management completion, after notifying the user equipment to manage the cells controlled by the local eNB aggregated by the user equipment through the dedicated signaling, and after receiving an RRC reconfiguration completion message from the user equipment; or notify the macro eNB of cell management completion, after receiving HARQ feedback on the MAC signaling notified for cell management from the user equipment; or notify the macro eNB of cell management completion, after a cell management completion moment is determined according to a cell management signaling sending moment and a fixed timing relationship.

Preferably, the second signal receiving and sending apparatus 5000 is further configured to send response information to the macro eNB, after the second processor 5100 manages the cells controlled by the local eNB.

Preferably, the second signal receiving and sending apparatus 5000 is further configured to send the secondary information of the cells controlled by the local eNB to the macro eNB.

Figure 6A:
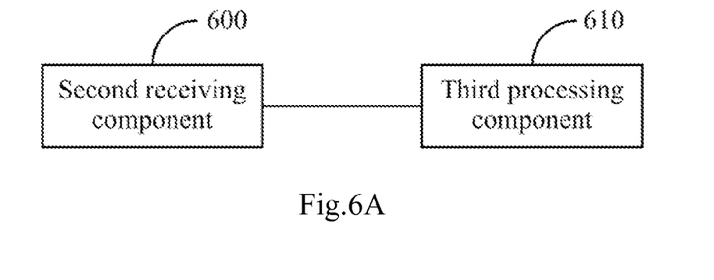
FIG. 6A is a schematic diagram of a functional structure of a user equipment in a system for cell management provided by an embodiment of the present invention.

As shown in FIG. 6A, the user equipment of the system for cell management in an embodiment of the present invention includes a second receiving component 600 and a third processing component 610.

The second receiving component 600 is configured to receive a notification of managing cells controlled by a connected local eNB from a network side;
the third processing component 610 is configured to manage the cells controlled by the local eNB according to the received notification.

Preferably, the third processing component 610 manages the cells controlled by the local eNB aggregated by the user equipment according to the configuration information of the cells needing to be managed in the received notification.

Preferably, after managing the cells controlled by the local eNB, the third processing component 610 sends RRC reconfiguration completion information to the network side.

Figure 6B:
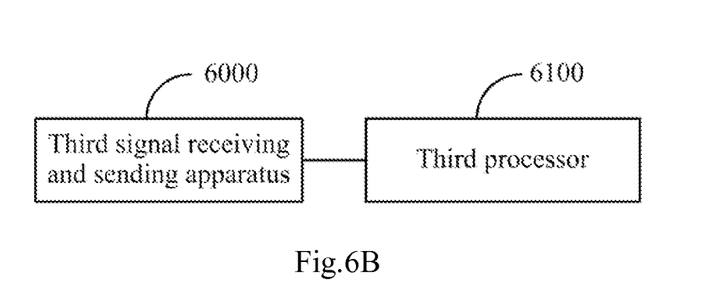
FIG. 6B is a schematic diagram of an entity structure of a user equipment in a system for cell management provided by an embodiment of the present invention.

Specifically, in hardware, the second receiving component 600 may be a signal receiving and sending apparatus including a receiving and sending antenna and the like, the third processing component 610 may be a signal receiving and sending apparatus including a processor and a receiving and sending antenna and the like, at this time, as shown in FIG. 6B, the user equipment of the system for cell management in an embodiment of the present invention includes:

a third signal receiving and sending apparatus 6000, configured to receive a notification of managing cells controlled by a connected local eNB from a network side;

a third processor 6100, configured to manage the cells controlled by the local eNB according to the received notification.

Preferably, the third processor 6100 manages the cells controlled by the local eNB aggregated by the user equipment according to the configuration information of the cells needing to be managed in the received notification.

Preferably, after the third processor 6100 manages the cells controlled by the local eNB, the third signal receiving and sending apparatus 6000 is further configured to send RRC reconfiguration completion information to the network side.

Based on the same inventive concept, embodiments of the present invention further provides a method for performing cell management by notification of a macro eNB, a method for performing cell management by a local eNB and a method for performing cell management by a user equipment, since the principles of these methods for solving the problems are similar to that of the system for cell management in the embodiment of the present invention in FIG. 3, the implementation of these methods may take the implementation of the system as reference, and the repeated parts will not be described redundantly herein.

Figure 7:
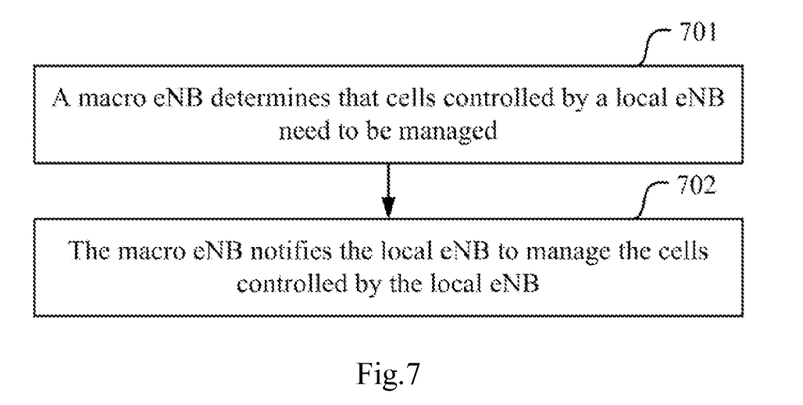
FIG. 7 is a schematic flow chart of a method for performing cell management by notification of a macro eNB provided by an embodiment of the present invention.

As shown in FIG. 7, the method for performing cell management by notification of a macro eNB in an embodiment of the present invention includes the following operations:

operation 701, determining, by a macro eNB, that cells controlled by a local eNB need to be managed;

operation 702, notifying, by the macro eNB, the local eNB to manage the cells controlled by the local eNB.

Preferably, after operation 701, the method may further include:
notifying, by the macro eNB, user equipment to manage the cells controlled by the local eNB aggregated by the user equipment through dedicated signaling, where the dedicated signaling is RRC signaling, MAC signaling or physical layer signaling.

Preferably, after the notifying, by the macro eNB, user equipment to manage the cells controlled by the local eNB aggregated by the user equipment through dedicated signaling, the method further includes:

after receiving an RRC reconfiguration completion message from the user equipment, notifying, by the macro eNB, the local eNB of cell management completion; or after receiving HARQ feedback on the MAC signaling notified for cell management from the user equipment, notifying, by the macro eNB, the local eNB of cell management completion; or after a cell management completion moment is determined according to a cell management signaling sending moment and a fixed timing relationship, notifying, by the macro eNB, the local eNB of cell management completion.

In operation 702, the macro eNB notifies the local eNB of the configuration information of the cells needing to be managed.

Preferably, the macro eNB notifies the user equipment of the configuration information of the cells needing to be managed.

If the macro eNB determines that a secondary cell controlled by the local eNB needs to be managed, the management on the secondary cell controlled by the local eNB includes at least one of the following operations: adding the secondary cell, deleting the secondary cell or modifying the configuration information of the secondary cell.

If the management on the secondary cell controlled by the local eNB is adding the secondary cell, the configuration information of the managed secondary cell includes all configuration information of the secondary cell;

if the management on the secondary cell controlled by the local eNB is deleting the secondary cell, the configuration information of the managed secondary cell includes an identifier of the secondary cell;

if the management on the secondary cell controlled by the local eNB is modifying the configuration information of the secondary cell, the configuration information of the managed secondary cell includes the configuration information of the secondary cell needing to be modified, or an identifier of the deleted secondary cell and all configuration information of the added secondary cell.

If the macro eNB determines that a primary cell controlled by the local eNB needs to be managed, the management on the primary cell controlled by the local eNB includes: selecting the primary cell or changing the primary cell.

Preferably, the macro eNB may also send the configuration information of the secondary cell controlled by the local eNB to the local eNB together with the configuration information of the primary cell.

Preferably, if the management on the primary cell controlled by the local eNB is changing the primary cell, the changed primary cell is in an activated state by default; or the changed primary cell is in an inactivated state by default, and when the primary cell needs to be used, the macro eNB sends activation signaling to the local eNB to activate the primary cell controlled by the local eNB.

Preferably, if the management on the primary cell controlled by the local eNB is changing the primary cell, no data transmission is performed between the local eNB and the user equipment, from receiving primary cell change indication to completing primary cell change.

Preferably, the macro eNB receives the secondary information from the cells controlled by the local eNB.

The secondary information includes a part or all of the following information:

cell load, the data size in PDCP, the data size in a RLC buffer, a cell interference condition or an identifier of the primary cell.

Figure 8:
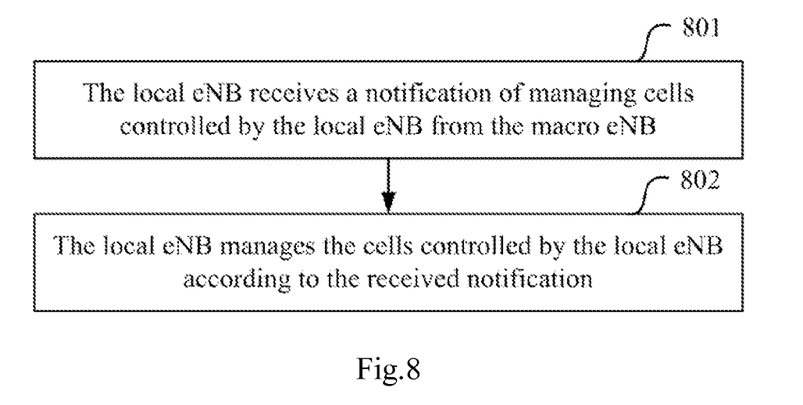
FIG. 8 is a schematic flow chart of a method for performing cell management by a local eNB provided by an embodiment of the present invention.

As shown in FIG. 8, the method for performing cell management by the local eNB in the embodiment of the present invention includes the following operations:

operation 801: receiving, by the local eNB, a notification of managing cells controlled by the local eNB from the macro eNB;

operation 802, managing, by the local eNB, the cells controlled by the local eNB according to the received notification.

Preferably, in operation 802, the local eNB manages the cells controlled by the local eNB according to the configuration information of the managed cells in the received notification.

Preferably, if the management on the cells controlled by the local eNB is management on a secondary cell controlled by the local eNB, the management on the secondary cell controlled by the local eNB includes at least one of the following operations: adding the secondary cell, deleting the secondary cell or modifying the configuration information of the secondary cell.

Preferably, if the management on the secondary cell controlled by the local eNB is adding the secondary cell, the configuration information of the managed secondary cell includes all configuration information of the secondary cell;

if the management on the secondary cell controlled by the local eNB is deleting the secondary cell, the configuration information of the managed secondary cell includes an identifier of the secondary cell;

if the management on the secondary cell controlled by the local eNB is modifying the configuration information of the secondary cell, the configuration information of the managed secondary cell includes the configuration information of the secondary cell needing to be modified, or an identifier of the deleted secondary cell and all configuration information of the added secondary cell.

Preferably, if the management on the cells controlled by the local eNB is management on a primary cell controlled by the local eNB, the management on the primary cell controlled by the local eNB includes: selecting the primary cell or changing the primary cell.

Preferably, if the notification further includes the configuration information of the secondary cell besides the configuration information of the primary cell, the local eNB manages the secondary cell controlled by the local eNB according to the configuration information of the secondary cell controlled by the local eNB in the received notification.

Preferably, the local eNB may also notify the user equipment to manage the cells controlled by the local eNB aggregated by the user equipment through dedicated signaling, after receiving the notification of managing the cells controlled by the local eNB from the macro eNB, where the dedicated signaling is RRC signaling, MAC signaling or physical layer signaling.

Preferably, after the local eNB notifies the user equipment to manage the cells controlled by the local eNB aggregated by the user equipment through the dedicated signaling, the method further includes:

notifying, by the local eNB, the macro eNB of cell management completion, after receiving an RRC reconfiguration completion message from the user equipment; or notifying, by the local eNB, the macro eNB of cell management completion, after receiving HARQ feedback on the MAC signaling notified for cell management from the user equipment; or notifying, by the local eNB, the macro eNB of cell management completion, after a cell management completion moment is determined according to a cell management signaling sending moment and a fixed timing relationship.

Preferably, the local eNB may also send response information to the macro eNB, after managing the cells controlled by the local eNB.

Preferably, the local eNB sends the secondary information of the cells controlled by the local eNB to the macro eNB.

The secondary information includes a part or all of the following information: cell load, the data size in PDCP, the data size in a RLC buffer, a cell interference condition or an identifier of the primary cell.

Figure 9:
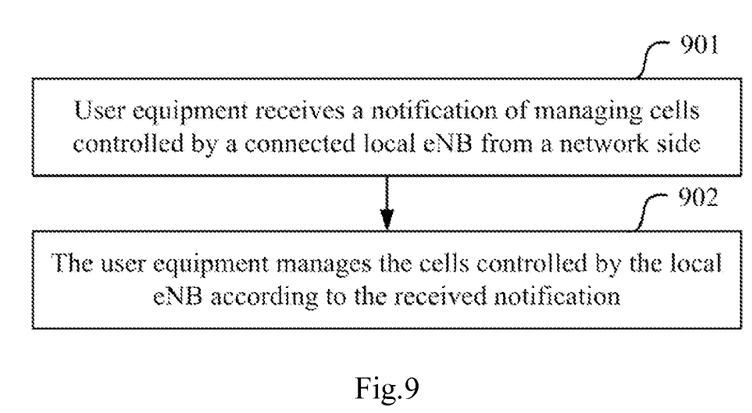
FIG. 9 is a schematic flow chart of a method for performing cell management by a user equipment provided by an embodiment of the present invention.

As shown in FIG. 9, the method for performing cell management by a user equipment in an embodiment of the present invention includes the following operations:

operation 901, receiving, by a user equipment, a notification of managing cells controlled by a connected local eNB from a network side;

operation 902, managing, by the user equipment, the cells controlled by the local eNB according to the received notification.

Preferably, in operation 902, the user equipment manages the cells controlled by the local eNB aggregated by the user equipment according to the configuration information of the cells needing to be managed in the received notification.

Preferably, if the management on the cells controlled by the local eNB is management on a secondary cell controlled by the local eNB, the management on the secondary cell controlled by the local eNB includes at least one of the following operations: adding the secondary cell, deleting the secondary cell and modifying the configuration information of the secondary cell.

Preferably, if the management on the secondary cell controlled by the local eNB is adding the secondary cell, the configuration information of the managed secondary cell includes all configuration information of the secondary cell;

if the management on the secondary cell controlled by the local eNB is deleting the secondary cell, the configuration information of the managed secondary cell includes an identifier of the secondary cell;

if the management on the secondary cell controlled by the local eNB is modifying the configuration information of the secondary cell, the configuration information of the managed secondary cell includes the configuration information of the secondary cell needing to be modified, or an identifier of the deleted secondary cell and all configuration information of the added secondary cell.

Preferably, if the management on the cells controlled by the local eNB is management on a primary cell controlled by the local eNB, the management on the primary cell controlled by the local eNB includes: selecting the primary cell or changing the primary cell.

Preferably, if the notification further includes the configuration information of the secondary cell besides the configuration information of the primary cell, the user equipment manages the secondary cell controlled by the local eNB aggregated by the user equipment according to the configuration information of the secondary cell controlled by the local eNB in the received notification.

Preferably, in operation 901, if the network side notifies the user equipment through the dedicated signaling and the dedicated signaling is the RRC signaling, the user equipment sends an RRC reconfiguration completion message to the network side, after managing the cells controlled by the local eNB.

The solution of the present invention will be illustrated below by specific examples.

Example 1

The Macro eNB Assists the Local eNB to Add a Secondary Cell

Operation 1: the Macro eNB Performs Secondary Cell Adding Judgment Controlled by the Local eNB:

the Macro eNB reports according to the measurement of the UE and/or determines the secondary cell needing to be added to the Local eNB according to the secondary information (for example, borne data size information, load information, interference condition and the like) fed back through an interface with the Local eNB.

Operation 2: the Macro eNB Notifies the UE to Add the Secondary Cell:

the Macro eNB adds the secondary cell controlled by the local eNB to the UE through RRC reconfiguration signaling, where the RRC reconfiguration signaling at least includes: a serial number of the secondary cell, a frequency point, PCI and related public radio resource configuration information (or dedicated radio resource configuration information).

After receiving the RRC reconfiguration signaling sent by the Macro eNB, the UE adds the secondary cell controlled by the local eNB according to the signaling indication and feeds back an RRC reconfiguration completion message to the Macro eNB.

Operation 3: the Macro eNB Notifies the Local eNB to Add the Secondary Cell:

the Macro eNB notifies the Local eNB of a result of the secondary cell to be added controlled by the local eNB determined by the Macro eNB through the interface between the Macro eNB and the Local eNB, where the content at least includes: a UE identifier, an identifier of the secondary cell, and the like. After adding the secondary cell, the Local eNB replies a response message (namely, replying a response message of cell management completion thereof) to the Macro eNB.

The Local eNB determines at which UE the management on the secondary cell is aimed according to the UE identifier.

Operation 4: the Macro eNB Indicates Secondary Cell Adding Completion to the Local eNB:

the Macro eNB receives the RRC reconfiguration completion message fed back by the UE and indicates secondary cell adding completion to the Local eNB. Optionally, the Local eNB needs to reply a response message (namely, a response message of UE cell management completion indication) to the Macro eNB.

Operation 5: the Newly Added Secondary Cell Normally Works:

the Local eNB may select to activate the newly added secondary cell according to the data transmission demand and judge whether needing to trigger the UE to perform random access on the cell according to the synchronous condition of the secondary cell, once the UE establishes uplink synchronization of the secondary cell, the Local eNB may normally schedule the secondary cell to perform data transmission.

Example 2

The Macro eNB Assists the Local eNB to Release a Secondary Cell

Operation 1: the Macro eNB Performs Secondary Cell Release Judgment Controlled by the Local eNB:

the Macro eNB reports according to the measurement of the UE and/or determines the secondary cell needing to be released by the Local eNB according to the secondary information (for example, borne data size information, load information, interference condition and the like) fed back through the interface with the Local eNB.

Operation 2: the Macro eNB Notifies the UE to Release the Secondary Cell:

the Macro eNB notifies the UE to release the secondary cell controlled by the local eNB through RRC reconfiguration signaling, where the RRC reconfiguration signaling at least includes: an identifier of the secondary cell (for example, a serial number of the secondary cell). After receiving the RRC reconfiguration signaling sent by the Macro eNB, the UE releases the related secondary cell controlled by the local eNB according to the signaling indication and feeds back an RRC reconfiguration completion message to the Macro eNB.

Operation 3: the Macro eNB Notifies the Local eNB to Release the Secondary Cell:

the Macro eNB notifies the Local eNB of the secondary cell needing to be released controlled by the local eNB determined by the Macro eNB through the interface between the Macro eNB and the Local eNB, where the content at least includes: a UE identifier and an identifier of the secondary cell. After releasing the secondary cell, the Local eNB needs to reply a response message (namely, replying a response message of cell management completion thereof) to the Macro eNB.

Operation 4: the Macro eNB Indicates Secondary Cell Release Completion to the Local eNB:

the operation is an optional operation, in which the Macro eNB receives the RRC reconfiguration completion message fed back by the UE and indicates secondary cell release completion to the Local eNB. The Local eNB may reply a response message (namely, a response message of UE cell management completion indication) to the Macro eNB.

Example 3

The Macro eNB Assists the Local eNB to Modify a Secondary Cell

Operation 1: the Macro eNB Performs Secondary Cell Parameter Modification Judgment Controlled by the Local eNB:

the Macro eNB reports according to the measurement of the UE and/or determines the secondary cell needing parameter modification for the Local eNB according to the secondary information (for example, a public or dedicated parameter to be modified) fed back through the interface with the Local eNB.

Operation 2: the Macro eNB Notifies the UE to Modify the Configuration of the Secondary Cell:

the Macro eNB modifies the configuration of the secondary cell controlled by the local eNB for the UE through RRC reconfiguration signaling, where the RRC reconfiguration signaling at least includes: a serial number of the secondary cell and public radio resource configuration information (or dedicated radio resource configuration information) to be modified. After receiving the RRC reconfiguration signaling sent by the Macro eNB, the UE modifies the parameter of the secondary cell controlled by the local eNB according to the signaling indication and feeds back an RRC reconfiguration completion message to the Macro eNB.

Operation 3: the Macro eNB Notifies the Local eNB to Modify the Parameter Configuration of the Secondary Cell:

the Macro eNB notifies the Local eNB of a result of the secondary cell to be modified controlled by the local eNB determined by the Macro eNB through the interface between the Macro eNB and the Local eNB, where the content at least includes: a UE identifier, an identifier of the secondary cell, public radio resource configuration information (or dedicated radio resource configuration information) to be modified, and the like, after modifying the secondary cell, the Local eNB needs to reply a response message (namely, replying a response message of cell management completion thereof) to the Macro eNB.

Operation 4: the Macro eNB Indicates Secondary Cell Parameter Modification Completion to the Local eNB:

the Macro eNB receives the RRC reconfiguration completion message fed back by the UE and indicates secondary cell parameter modification completion to the Local eNB. Optionally, the Local eNB may reply a response message (namely, a response message of UE cell management completion indication) to the Macro eNB.

Operation 5: the Newly Added Secondary Cell Normally Works:

the Local eNB begins to normally work on the secondary cell according to the modified parameter.

Example 4

During DRB Separation, the Local eNB Selects a Primary Cell

Operation 1: the Macro eNB Selects a Primary Cell Controlled by the Local eNB:

when the Macro eNB judges that bearer separation needs to be performed, the Macro eNB may carry the configuration information of an expected primary cell controlled by the local eNB in a bearer separation request, optionally, the configuration of an expected secondary cell controlled by the local eNB may also be carried. The Macro eNB selects the expected primary/secondary cell (the primary/secondary cell indicates that the primary cell is necessary, the secondary cell is optional, and similarly hereinafter) controlled by the local eNB mainly depending on the measurement of the UE.

Operation 2: the Macro eNB Notifies the Local eNB of a Primary Cell Configuration result:

the Local eNB receives a bearer separation request message sent by the Macro eNB, where the message at least includes such parameters as a UE identifier, an identifier of a bearer to be separated, primary cell configuration and the like. The Local eNB accepts the primary/secondary cell configuration configured by the Macro eNB, and then sends a bearer separation response message to the Local eNB. The primary/secondary cell configuration may be carried in the bearer separation response message or not.

Operation 3: the Macro eNB Notifies the UE of Related Configuration of the Local eNB:

the Macro eNB sends an RRC reconfiguration message to the UE, if the bearer separation response message received by the Macro eNB does not include the primary/secondary cell configuration, the Macro eNB needs to add related configuration information in the RRC reconfiguration message. The UE receives RRC reconfiguration signaling, applies related configuration and feeds back a reconfiguration completion message to the Macro eNB.

Operation 4: the Macro eNB Indicates DRB Separation Completion to the Local eNB:

the Macro eNB receives the reconfiguration completion message and notifies the Local eNB of reconfiguration completion.

Operation 5: the UE Normally Works at the Local eNB:

the Local eNB and the UE begin to work on the newly configured primary/secondary cell controlled by the local eNB, the new primary cell may be activated or deactivated by default. If it is deactivated by default, the Macro eNB needs to send activation signaling to perform activation, the Macro eNB needs to notify the Local eNB after performing activation, and the Local eNB may normally work on the cells controlled by the local eNB.

Example 5

The Local eNB Changes a Primary Cell

Operation 1: the Macro eNB Performs Primary Cell Change Judgment Controlled by the Local eNB:

the Macro eNB judges whether the Local eNB needs to change the primary cell according to a measurement result of UE and/or secondary information (for example, interference of the current primary cell, load, an intended primary cell and the like) fed back through an interface with the Local eNB. If the Macro eNB judges that the primary cell needs to be changed controlled by the local eNB, the Macro eNB determines a new primary cell.

Operation 2: the Macro eNB Notifies the Local eNB of a Primary Cell Change Result:

the Macro eNB sends primary cell reconfiguration signaling to the Local eNB through the interface between the Macro eNB and the Local eNB, in order to indicate the Local eNB to update the PCells thereof and related configuration information of the PCells. The message at least includes a UE identifier and related configuration of the new primary cell. Optionally, the configuration of an expected secondary cell controlled by the local eNB may also be carried.

The Local eNB receives the message, stops the data transmission (including sending scheduling, SRS receiving, and the like) of all cells controlled by the local eNB and updates the new primary cell and the configuration thereof. After the new primary cell is configured, reconfiguration completion indication information is replied to the Macro eNB through the interface between the eNBs.

Operation 3: the Macro eNB Notifies the UE of a Primary Cell Configuration Result:

the Macro eNB sends RRC reconfiguration signaling to the UE and reconfigures the primary cell controlled by the local eNB. Optionally, the configuration of the expected secondary cell controlled by the local eNB may also be carried. After receiving primary cell reconfiguration signaling, the UE reconfigures the primary cell of the Local eNB and does not need to perform such operations as key change, RLC/PDCP reestablishment and the like, while only needing to change related configuration of the primary cell and feed back a reconfiguration completion message to the Macro eNB.

Operation 4: the Macro eNB Indicates UE Primary Cell Change Completion Controlled by the Local eNB to the Local eNB:

the Macro eNB indicates UE primary cell reconfiguration completion to the Local eNB, after receiving the completion message of the UE.

Operation 5: the UE Normally Works at the Local eNB:

the Local eNB and the UE begin to normally work on the new primary cell, for example, establishing uplink synchronization of the UE and the Local eNB on the new primary cell, and performing data transmission. The new primary cell may be activated or deactivated by default. If it is deactivated by default, the Macro eNB needs to send activation signaling to perform activation, the Macro eNB needs to notify the Local eNB after performing activation, and the Local eNB may normally work on the cells controlled by the local eNB.

It should be noted that:

1. the sequence of operation 2 and operation 3 in all of the above-mentioned embodiments is not strictly limited, operation 2 may be firstly implemented and then operation 3 is implemented, or operation 3 is firstly implemented and then operation 2 is implemented, or the two operations are implemented at the same time.

2. Operation 3 and operation 4 may be merged, namely, the Macro eNB firstly sends the RRC reconfiguration signaling to the UE and notifies the Local eNB to implement related operations after the UE feeds back the reconfiguration completion message or ACK, in this way, in operation 4, the sending, by the Macro eNB, the UE reconfiguration completion indication message to the Local eNB may be omitted.

3. Operation 2, operation 3 and operation 4 may also be modified as follows: the Macro eNB notifies the Local eNB to perform related operations, and receives the response message of the Local eNB, and then notifies the UE to perform RRC connection reconfiguration.

4. In the case of primary/secondary cell configuration failure, the UE may be triggered to perform RRC connection reconfiguration.

Those skilled in the art should appreciate that embodiments of the present invention may be provided as a method, a system, or a computer program product. Accordingly, the present invention may adopt the form of a complete hardware embodiment, a complete software embodiment, or an embodiment combining software with hardware. Furthermore, the present invention may adopt the form of one or multiple computer program products implemented on a computer available storage medium (including, but not limited to, disk memory, a CD-ROM, an optical memory, etc.) and including a computer available program code.

The present invention is described in accordance with the flow chart and/or block diagram of the method, the device (system) and the computer program product in embodiments of the present invention. It should be understood that each flow and/or block in the flowchart and/or the block diagram and the combination of the flows and/or blocks in the flowchart and/or the block diagram may be implemented by computer program instructions. These computer program instructions may be provided to the processors of a general-purpose computer, a special-purpose computer, an embedded processor or other programmable data processing devices to generate a machine, in order to generate an apparatus used for achieving appointed functions in one flow or multiple flows in the flowchart and/or one block or multiple blocks in the block diagram, by means of the instructions implemented by the processors of the computers or the other programmable data processing devices.

These computer program instructions may also be stored in a computer readable memory capable of guiding the computers or the other programmable data processing devices to work in a particular manner, in order to enable the instructions stored in the computer readable memory to generate a product including an instruction apparatus, and the instruction apparatus achieves the appointed functions in one flow or multiple flows in the flowchart and/or one block or multiple blocks in the block diagram.

These computer program instructions may also be loaded on the computers or the other programmable data processing devices to implement a series of operation steps on the computers or the other programmable data processing devices to generate processing achieved by the computers, such that the instructions implemented on the computers or the other programmable data processing devices provide operations used for achieving the appointed functions in one flow or multiple flows in the flowchart and/or one block or multiple blocks in the block diagram.

Although the preferred embodiments of the present invention have been described, those skilled in the art, once mastering the basic inventive concept, may make additional changes and modifications to these embodiments. Therefore, the appended claims are intended to be explained to include the preferred embodiments and all changes and modifications falling within the scope of the present invention.

Apparently, those skilled in the art may make various modifications and variations to the present invention, without departing from the spirit and scope of the present invention. In this way, if these modifications and variations of the present invention belong to the scope of the claims of the present invention and the equivalent technology thereof, the present invention is also intended to include these modifications and variations.

The invention claimed is:

1. A method for cell management, comprising:
   determining, by a macro eNB, that cells served by a local eNB need to be managed; and transmitting, by the macro eNB, configuration information to the local eNB to manage the cells served by the local eNB, wherein managing the cells comprises at least one of the following: selecting or changing a primary cell, or adding, deleting or modifying a secondary cell;

wherein the configuration information comprises configuration information of the primary cell when managing the cells comprises selecting or changing the primary cell; and wherein the configuration information comprises configuration information of the secondary cell when managing the cells comprises adding, deleting or modifying the secondary cell.

2. The method according to claim 1, wherein after the determining, by a macro eNB, that cells served by a local eNB need to be managed, the method further comprises:

notifying, by the macro eNB, user equipment to manage the cells served by the local eNB aggregated by the user equipment through dedicated signaling, wherein the dedicated signaling is Radio Resource Control, (RRC), signaling, Medium Access Control (MAC), signaling or physical layer signaling.

3. The method according to claim 2, wherein after the notifying, by the macro eNB, user equipment to manage the cells controlled by the local eNB aggregated by the user equipment through dedicated signaling, the method further comprises:

notifying, by the macro eNB, the local eNB of cell management completion, after receiving an RRC reconfiguration completion message from the user equipment; or notifying, by the macro eNB, the local eNB of cell management completion, after receiving Hybrid Automatic Repeat reQuest (HARQ), feedback on the MAC signaling notified for cell management from the user equipment; or notifying, by the macro eNB, the local eNB of cell management completion, after a cell management completion moment is determined according to a cell management signaling sending moment and a fixed timing relationship.

4. The method according to claim 1, wherein transmitting the configuration information comprises:

notifying, by the macro eNB, the local eNB of configuration information of the cells needing to be managed.

5. The method according to claim 2, wherein the notifying, by the macro eNB, the user equipment to manage the cells served by the local eNB, comprises:

notifying, by the macro eNB, the user equipment of configuration information of the cells needing to be managed.

6. The method according to claim 4, wherein the determining, by the macro eNB, that cells served by the local eNB need to be managed, comprises:

determining, by the macro eNB, that a secondary cell served by the local eNB needs to be managed;

the management on the secondary cell served by the local eNB comprises at least one of the following operations: adding the secondary cell, deleting the secondary cell or modifying the configuration information of the secondary cell, wherein the management on the secondary cell served by the local eNB is adding the secondary cell, and the configuration information of the managed secondary cell comprises all configuration information of the secondary cell;

the management on the secondary cell served by the local eNB is deleting the secondary cell, and the configuration information of the managed secondary cell comprises an identifier of the secondary cell;

the management on the secondary cell served by the local eNB is modifying the configuration information of the secondary cell, and the configuration information of the managed secondary cell comprises the configuration information of the secondary cell needing to be modified, or an identifier of a deleted secondary cell and all configuration information of an added secondary cell.

7. The method according to claim 1, further comprising:

receiving, by the macro eNB, secondary information of the cells served by the local eNB.

8. The method according to claim 7, wherein the secondary information comprises a part or all of the following information:

cell load, a data size in a Packet Data Convergence Protocol, PDCP, a data size in a Radio Link Control, RLC, buffer, a cell interference condition or an identifier of the primary cell.

9. A method for cell management, comprising:

receiving, by a local eNB from a macro eNB, configuration information to manage cells served by the local eNB, wherein managing the cells comprises at least one of the following: selecting or changing a primary cell, or adding, deleting or modifying a secondary cell;

wherein the configuration information comprises configuration information of the primary cell when managing the cells comprises selecting or changing the primary cell;

wherein the configuration information comprises configuration information of the secondary cell when managing the cells comprises adding, deleting or modifying the secondary cell; and managing, by the local eNB, the cells served by the local eNB according to the configuration information.

10. The method according to claim 9, wherein the managing, by the local eNB, the cells served by the local eNB, comprises:

managing, by the local eNB, the cells served by the local eNB according to configuration information of the managed cells in the received notification.

11. The method according to claim 10, wherein the management on the cells served by the local eNB is management on a secondary cell served by the local eNB;

the management on the secondary cell served by the local eNB comprises at least one of the following operations: adding the secondary cell, deleting the secondary cell or modifying the configuration information of the secondary cell, wherein the management on the secondary cell served by the local eNB is adding the secondary cell, and the configuration information of the managed secondary cell comprises all configuration information of the secondary cell;

the management on the secondary cell served by the local eNB is deleting the secondary cell, and the configuration information of the managed secondary cell comprises an identifier of the secondary cell;

the management on the secondary cell served by the local eNB is modifying the configuration information of the secondary cell, the configuration information of the managed secondary cell comprises the configuration information of the secondary cell needing to be modified, or an identifier of a deleted secondary cell or all configuration information of an added secondary cell.

12. The method according to claim 9, wherein the method further comprises:

notifying, by the local eNB, user equipment to manage the cells served by the local eNB aggregated by the user equipment through dedicated signaling, wherein the dedicated signaling is Radio Resource Control (RRC), signaling, Medium Access Control (MAC), signaling or physical layer signaling.

13. The method according to claim 12, wherein after the notifying, by the local eNB, user equipment to manage the cells served by the local eNB aggregated by the user equipment through dedicated signaling, the method further comprises:

notifying, by the local eNB, the macro eNB of cell management completion, after receiving an RRC reconfiguration completion message from the user equipment; or notifying, by the local eNB, the macro eNB of cell management completion, after receiving Hybrid Automatic Repeat request (HARQ), feedback on the MAC signaling notified for cell management from the user equipment; or notifying, by the local eNB, the macro eNB of cell management completion, after a cell management completion moment is determined according to a cell management signaling sending moment and a fixed timing relationship.

14. The method according to claim 9, wherein after the managing, by the local eNB, the cells served by the local eNB, the method further comprises:

sending back, by the local eNB, response information to the macro eNB.

15. The method according to claim 9, further comprising:

sending, by the local eNB, secondary information of the cells served by the local eNB to the macro eNB.

16. The method according to claim 15, wherein the secondary information comprises a part or all of the following information:

cell load, a data size in a Packet Data Convergence Protocol, PDCP, a data size in a Radio Link Control, RLC, buffer, a cell interference condition or an identifier of the primary cell.

17. A method for performing cell management, comprising:

receiving, by a user equipment from a macro eNB, configuration information to manage cells served by a connected local eNB from a network side, wherein the managing the cells comprises at least one of the following: selecting or changing a primary cell, or adding, deleting or modifying a secondary cell;

wherein the configuration information comprises configuration information of the primary cell when managing the cells comprises selecting or changing the primary cell;

wherein the configuration information comprises configuration information of the secondary cell when managing the cells comprises adding, deleting or modifying the secondary cell; and managing, by the user equipment, the cells served by the local eNB according to the configuration information.

18. The method according to claim 17, wherein the managing, by the user equipment, the cells served by the local eNB, comprises:

managing, by the user equipment, the cells served by the local eNB aggregated by the user equipment according to the configuration information of the cells needing to be managed in the received notification.

19. The method according to claim 18, wherein the management on the cells served by the local eNB is management on a secondary cell served by the local eNB;

the management on the secondary cell served by the local eNB comprises at least one of the following operations: adding the secondary cell, deleting the secondary cell or modifying the configuration information of the secondary cell, wherein the management on the secondary cell served by the local eNB is adding the secondary cell, and the configuration information of the managed secondary cell comprises all configuration information of the secondary cell;

the management on the secondary cell served by the local eNB is deleting the secondary cell, and the configuration information of the managed secondary cell comprises an identifier of the secondary cell;

the management on the secondary cell served by the local eNB is modifying the configuration information of the secondary cell, the configuration information of the managed secondary cell comprises the configuration information of the secondary cell needing to be modified, or an identifier of a deleted secondary cell and all configuration information of an added secondary cell.

20. The method according to claim 17, wherein after the managing, by the user equipment, the cells served by the local eNB, the method further comprises:

sending back, by the user equipment, Radio Resource Control, RRC, reconfiguration completion information to the network side, or performing, by the user equipment, Hybrid Automatic Repeat request (HARQ), feedback on the Medium Access Control (MAC), signaling notified for cell management.

\* \* \* \* \*